United States Patent
Buvat et al.

(10) Patent No.: US 11,180,620 B2
(45) Date of Patent: *Nov. 23, 2021

(54) PROTON-CONDUCTING INORGANIC PARTICLES, METHOD FOR THE PREPARATION THEREOF, AND USE THEREOF TO FORM A FUEL CELL MEMBRANE

(71) Applicants: COMMISSARIAT À L'ÉNERGIE ATOMIQUE ET AUX ÉNERGIES ALTERNATIVES, Paris (FR); SPECIFIC POLYMERS, Castries (FR)

(72) Inventors: Pierrick Buvat, Montbazon (FR); Janick Bigarré, Tours (FR); Julien Cellier, Veigne (FR); Cédric Loubat, Vendargues (FR); Quentin Crouzet, Octon (FR)

(73) Assignees: COMMISSARIAT À L'ÉNERGIE ATOMIQUE ET AUX ÉNERGIES ALTERNATIVES, Paris (FR); SPECIFIC POLYMERS, Castries (FR)

( * ) Notice: Subject to any disclaimer, the term of this patent is extended or adjusted under 35 U.S.C. 154(b) by 122 days.

This patent is subject to a terminal disclaimer.

(21) Appl. No.: 16/480,463

(22) PCT Filed: Jan. 24, 2018

(86) PCT No.: PCT/FR2018/050162
§ 371 (c)(1),
(2) Date: Jul. 24, 2019

(87) PCT Pub. No.: WO2018/138433
PCT Pub. Date: Aug. 2, 2018

(65) Prior Publication Data
US 2019/0345301 A1    Nov. 14, 2019

(30) Foreign Application Priority Data
Jan. 25, 2017 (FR) .................... 17 50604

(51) Int. Cl.
*C08J 5/22* (2006.01)
*C08F 12/30* (2006.01)
(Continued)

(52) U.S. Cl.
CPC ............. *C08J 5/2237* (2013.01); *C08F 12/30* (2013.01); *C08F 214/222* (2013.01);
(Continued)

(58) Field of Classification Search
CPC .... H01M 8/1004; C08J 5/2237; C08J 5/2225; C08J 5/2218; C08J 5/2243;
(Continued)

(56) References Cited

U.S. PATENT DOCUMENTS 6,210,790 B1 * 4/2001 Crivello ................ C08F 230/08
428/325
9,120,916 B1 * 9/2015 Swarup .............. C08G 18/6229
(Continued)

FOREIGN PATENT DOCUMENTS

CN     108250371 A   *   7/2018
EP      2624333 A1     8/2013
(Continued)

OTHER PUBLICATIONS

Machine translation of CN 108250371 (no date).*
(Continued)

*Primary Examiner* — Amanda C. Walke
(74) *Attorney, Agent, or Firm* — Pearne & Gordon LLP

(57) ABSTRACT

The invention relates to inorganic particles which are covalently bonded to first polymer chains made up of at least one polymer carrying proton exchange groups, optionally in the form of salts, and bonded to second polymer chains made up of at least one fluorinated polymer that does not carry any proton exchange groups, the second chains being bonded to the particles via organic spacer groups, or the second chains
(Continued)

being bonded to first chains via organic spacer groups, or some of the second chains being bonded to the particles via organic spacer groups while the remaining second chains are bonded to first chains via organic spacer groups.

15 Claims, 1 Drawing Sheet

(51) Int. Cl.
| | | |
|---|---|---|
| C08F 214/22 | (2006.01) | |
| C08K 3/36 | (2006.01) | |
| H01M 8/1004 | (2016.01) | |
| H01M 8/1069 | (2016.01) | |

(52) U.S. Cl.
CPC .............. *C08J 5/2243* (2013.01); *C08K 3/36* (2013.01); *H01M 8/1004* (2013.01); *H01M 8/1069* (2013.01); *C08J 2325/06* (2013.01); *C08J 2327/16* (2013.01); *C08J 2327/18* (2013.01)

(58) Field of Classification Search
CPC .......... C08J 2325/06; C08J 2327/16; C08J 2327/18; C08F 12/30; C08F 214/222
See application file for complete search history.

(56) References Cited

U.S. PATENT DOCUMENTS

| 9,434,794 | B2* | 9/2016 | Hishikawa | C08F 2/38 |
|---|---|---|---|---|
| 2005/0053818 | A1* | 3/2005 | St-Arnaud | B01D 69/141 |
| | | | | 429/431 |
| 2005/0227135 | A1 | 10/2005 | Chalkova et al. | |
| 2005/0244697 | A1 | 11/2005 | Tafy, III et al. | |
| 2007/0207359 | A1 | 9/2007 | Chen et al. | |
| 2008/0233451 | A1* | 9/2008 | Hong | H01M 8/1023 |
| | | | | 429/492 |
| 2010/0196786 | A1 | 8/2010 | Niepceron et al. | |
| 2013/0005881 | A1* | 1/2013 | Yang | C08L 51/10 |
| | | | | 524/145 |
| 2013/0199030 | A1 | 8/2013 | Song et al. | |
| 2014/0113982 | A1 | 4/2014 | Bigarre et al. | |
| 2017/0226381 | A1* | 8/2017 | Lan | C09K 3/1436 |
| 2019/0097242 | A1 | 3/2019 | Buvat et al. | |
| 2019/0109329 | A1 | 4/2019 | Buvat et al. | |
| 2019/0177461 | A1 | 6/2019 | Buvat et al. | |

FOREIGN PATENT DOCUMENTS

| FR | 2 917 733 A1 | 12/2008 |
|---|---|---|
| FR | 2 967 925 A1 | 6/2012 |

OTHER PUBLICATIONS

International Search Report for International Application No. PCT/FR2018/050162, dated May 7, 2018.
Written Opinion for International Application No. PCT/FR2018/0050162, dated May 7, 2018.
Preliminary French Search Report for Application No. 17 50604, dated Sep. 29, 2017.
Yumi Kwon et al.: "Effect of PMMA-graft-silica nanoparticles on the gas permeation properties of hexafluoroisopropylidene-based plyimide membranes", Separation and Purification Technology, Elsevier Science, Amsterdam, NL, vol. 78, N°3, Feb. 11, 2011 (Feb. 11, 2011), pp. 281-289, XP028194429.
Tena et al.: "Mixed matrix membranes of 6FDA-6FpDA with surface functionalized 3-alumina particles. An analysis of the improvement of permselectivity for several gas pairs", Chemical Engineering Science, Oxford, GG, vol. 65, n°6, Mar. 15, 2010 (Mar. 15, 2010), pp. 2227-2235, XP 026908758.
Zhiquan Shi et al.: "Facile fabrication and characterization of poly(tetrafluoroethylene)@polypyrrole/nanosilver composite membranes with conducting and antibacterial property", Applied Surface Science, Elsevier, Amsterdam, NL, vol. 258, n°17, Mar. 12, 2012 (Mar. 12, 2012), pp. 6359-6365, XP028416364.
Subianto Surya et al.: "Physical and chemical modification routes leading to improved mechanical properties of perfluorosulfonic acid membranes for PEM fuel cells", Journal of Power Sources, Elsevier SA, CH, vol. 233, Feb. 16, 2013 (Feb. 16, 2013), pp. 216-230, XP 028997696.
Database WPI Week 199701, Oct. 22, 1996, Thomas Scientific, London, GB; AN 1997-007535, XP 002780256.

* cited by examiner

PROTON-CONDUCTING INORGANIC PARTICLES, METHOD FOR THE PREPARATION THEREOF, AND USE THEREOF TO FORM A FUEL CELL MEMBRANE

CROSS-REFERENCE TO RELATED APPLICATIONS

This is a National Stage application of PCT international application PCT/FR2018/050162, filed on Jan. 24, 2018, which claims the priority of French Patent Application No. 17 50604, filed Jan. 25, 2017, both of which are incorporated herein by reference in their entireties.

TECHNICAL FIELD

This invention relates to specific proton-conducting inorganic particles.

This invention also relates to methods for the preparation thereof as well as the use thereof as fuel cell membranes.

These particles have the characteristic of having an ion exchange capacity that is particularly high, due to the fact that they comprise proton-exchanging groups. Therefore, these particles have their application in the elaboration of proton-conducting material, in particular of materials intended to enter into the constitution of proton-conducting membranes, for example, for fuel cells, such as the cells that operate with $H_2$/air or $H_2/O_2$ (known as the abbreviation PEMFC meaning "Proton Exchange Membrane Fuel Cell") or operating with methanol/air (known as the abbreviation DMFC meaning "Direct Methanol Fuel Cell"), for electrolysers, such as sodium chlorine electrolysers, PEMEC electrolysers (PEMEC meaning "Proton Exchange Membrane Electrolysis Cell") for electrolyte flow batteries (referred to as "batteries redox flow") or for water purification devices.

Thus, the technical field of the invention can be defined, generally, as that of proton-conducting particles and of the materials containing them, in particular for an application in a fuel cell.

PRIOR ART

A fuel cell is an electrochemical generator that converts the chemical energy of an oxidation reaction of a fuel in the presence of an oxidiser into electrical energy.

Generally, a fuel cell comprises a plurality of electrochemical cells mounted in series, with each cell comprising two electrodes of opposite polarity separated by a proton-exchanging membrane that act as a solid electrolyte.

The membrane provides the passage to the cathode of the protons formed during the oxidation of the fuel at the anode.

The membranes structure the core of the cell and must, consequently, have good performance in terms of proton conduction, as well as low permeability to reactant gases ($H_2$/air or $H_2/O_2$ for PEMFC cells and methanol/air for DMFC cells). The properties of the materials that form the membranes are substantially thermal stability, resistance to hydrolysis and to oxidation as well as a certain mechanical flexibility.

Commonly used membranes that satisfy these requirements are membranes obtained from polymers that belong, for example, to the family of polysulfones, of polyetherketones, of polyphenylenes. However, it has been observed that these non-fluorinated polymers break down relatively quickly in a fuel cell environment and their service life remains, for the moment, insufficient for the PEMFC application.

Membranes that have more substantial properties in terms of service life are membranes obtained from polymers formed from a main perfluorinated linear chain and from side chains carrying an acid group, such as sulphonic acid groups. Among the most well known, mention can be made of the membranes marketed under the name NAFION® by the company Dupont de Nemours or under the name Dow®, FLEMION® or Aciplex by the companies Dow Chemicals and Asahi Glass. These membranes have good electrochemical performance and an interesting service life but nevertheless are insufficient for PEMFC applications. In addition, their cost (more than 500 euros/m$^2$) remains prohibitive for marketing. For DMFC applications, they have a high permeability to methanol, which also limits their use with this type of fuel. What is more, the monomers that form them have a structure of the hydrophilic/hydrophobic type, which makes them particularly sensitive to the phenomena of hydration and dehydration. Thus, the operating temperature is typically around 80° C., since above that the hydration instabilities prematurely age the membranes.

There is therefore a real need to stabilise the proton conduction of these membranes around 100° C. To do this, certain authors have directed their effort to developing more complex membranes that comprise in addition to a matrix made of a conducting organic polymer, compounds or particles that can provide additional conductivity. When the particles are mineral particles, these membranes are designated in particular by the terminology "inorganic-organic hybrid membranes".

Thus, patents US 2005/0227135 and US 2005/0244697 describe the introduction of hydrophilic inorganic compounds, in order to improve the level of hydration of the membranes at high temperature (with the inorganic compounds being agglomerates of particles of metal oxides or of metal phosphates for US 2005/0227135 or of cation-exchanging materials with a clay base for US 2005/0244697).

However, although these formulations of composite membranes improve the proton conductivities of the membranes around 100° C., they remain insufficient for satisfying the operating criteria of a fuel cell at these temperatures. What is more, the polymer matrices that receive these inorganic compounds already have a good level of proton conduction.

Also proposed, in FR 2 917 733, are inorganic particles (such as particles of silica) grafted, covalently, by proton-conducting polymers, such as poly-sodium 4-vinylbenzene-sulfonate. These particles are then incorporated into polymeric matrices in order to form a composite material that can form a proton-conducting membrane for fuel cells.

These particles have an excellent ion exchange capacity. They also have the particularity of being grafted by water-soluble polymers. Thus, placed in an aqueous phase, the particles form a dispersion on a nanometric scale, of which the grafted polymer chain are solubilised (in other terms, the particles are solvated by the polymer chains), whereby the mixture of the particles and of the aqueous phase visually have the form of a transparent solution. In a fuel cell environment that involves an aqueous medium for the transfer of protons, such particles cannot be used as to form a membrane but must be used in the form of composite materials, wherein they form a filler embedded in a polymeric matrix. In operation in the fuel cell, the membrane is used as a bridge for the transfer of protons between the anode compartment and the cathode compartment, with the transfer being provided by proton-conducting groups, such as —$SO_3H$, —$PO_3H_2$ or —$CO_2H$ groups. In order to reach substantial conductivities, it is suitable that the membrane be sufficiently hydrated, in order to form a hydrophilic network within the latter. Then, the transfer of protons is accompanied by a phenomenon of electroosmosis leading to the migration of molecules of water from the anode compartment to the cathode compartment. This water is added to that which is created on the cathode compartment, during the reduction reactions of the oxygen. This results in a water concentration gradient between the cathode compartment, rich in water and the anode compartment, poor in water, which generates an osmotic pressure leading to transfers of water from the cathode compartment to the anode compartment. During these transfers, the polymers grafted on the surface of the particles can be led to be solubilised. In this case, the transfers of water between the anode and cathode compartments generate a driving force within the particles that can, despite the solid phase formed by the inorganic material comprising the core of the particles, cause them to migrate to the surface of the membrane thus leading to a depletion of the latter and, in time, to a decrease in conductivity performance of the latter.

The same mechanisms are at play in electrolysers, with the additional particularity that, in such devices, the membranes are entirely immersed in an aqueous phase, which can amplify the phenomenon of elution of the particles contained in the membranes.

Also, there is therefore a real need in terms of proton-conducting particles that can have both good proton conduction while still having less mobility when they are used in proton-conducting membranes. In other terms, there is a need for proton-conducting particles that are not subject to a risk of elution in a context of operating in an aqueous medium, such as the case of fuel cells and of electrolysers.

DISCLOSURE OF THE INVENTION

Thus the invention relates to inorganic particles bonded, covalently, to polymer chains (referred to as first chains) constituted of at least one polymer carrying proton-exchanging groups, optionally in the form of salts, said particles also being bonded to polymer chains (referred to as second chains) constituted of at least one fluorinated polymer not carrying proton-exchanging groups, with the bond between the particles and said second chains corresponding to one of the following alternatives:

said second chains are bonded to the particles via organic spacer groups; or
said second chains are bonded to first chains (such as defined hereinabove) via organic spacer groups; or
a portion of said second chains is bonded to the particles via organic spacer groups while the other portion of said second chains is bonded to first chains (such as defined hereinabove) via organic spacer groups.

Thanks to the grafting of the two types of polymer chains mentioned hereinabove, the particles can have, on the one hand, a substantial ion exchange capacity thanks to the first chains (said ion exchange capacity being directly linked to the number of proton-exchanging acid groups) and are not subjected, on the other hand, to the phenomenon of solubilisation or even elution, when they are put into contact with an aqueous environment, because the second chains have a non-water-soluble nature. Finally, these second chains contribute in making the particles able to be used directly as is as membranes. It is therefore no longer necessary to mix the particles with a polymer forming a matrix in order to give rise to a composite material, as is the case in prior art.

Furthermore, the particles in accordance with the invention have, contrary to the particles of prior art, less water swelling (said swelling can be responsible for an accelerated ageing phenomenon), better conductivity and, in a cell environment, make it possible to obtain a decline in voltage as a function of the time that is less than with the particles of prior art.

As mentioned hereinabove, the particles are bonded, among others, to first chains constituted of at least one polymer carrying proton-exchanging groups, optionally in the form of salts.

By way of examples of proton-exchanging groups, mention can be made of the groups chosen from the groups having formulas —$PO_3H_2$, —$CO_2H$, or —$SO_3H$, with the groups optionally able to be in the form of salts.

The term salts means, in terms of the invention, groups with an ion structure resulting from the action of a mineral base on the labile proton or proton of the proton-exchanging acid groups.

When reference is made to the groups —$PO_3H_2$, —$CO_2H$, —$SO_3H$, the salts that correspond to the latter are groups having formulas —$PO_3X_2$, —$CO_2X$, —$SO_3X$, wherein X is a monovalent cation, such as an alkali cation such as $Na^+$.

The polymer or polymers carrying proton-exchanging groups, optionally in the form of salts, forming first polymer chains can be polymers that comprise one or several repetitive units coming from the polymerisation of one or several vinyl monomers, i.e. monomers comprising at least one ethylenic group (or double carbon-carbon bond), said monomers have at least one proton-exchanging group, optionally in the form of salts.

The term repetitive unit means here a bivalent group coming from a monomer after polymerisation of the latter.

Among the vinyl monomers that can be used, mention can be made of vinylsulfonic acid, vinylphosphonic acid, vinylacetic acid and the salts thereof.

Mention can also be made of styrenic monomers comprising at least one proton-exchanging group, such as a —$SO_3H$, —$PO_3H_2$ and —$CO_2H$ group, optionally in the form of salts. Specific styrenic monomers are 4-vinylbenzoic acid, 3-vinylbenzoic acid, 4-vinylbenzenesulfonic acid, 3-vinylbenzenesulfonic acid, 4-vinylbenzenephosphonic acid, 3-vinylbenzenephosphonic acid and 4-vinylbenzenemethylphosphonic acid and the salts thereof.

By way of examples of polymers carrying proton-exchanging groups, optionally in the form of salts, mention can be made of poly(sodium 4-vinylbenzenesulfonate) or poly(4-vinylbenzenesulfonic acid), with the repetitive unit of these polymers respectively having the following formulas (I) and (II):

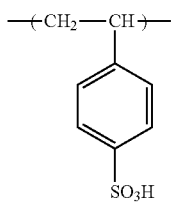

(II)

By way of examples, the first chains are comprised solely of poly(sodium 4-vinylbenzenesulfonate) or of poly(4-vinylbenzenesulfonic acid).

The first chains formed by the polymer or polymers carrying proton-exchanging groups, optionally in the form of salts, are covalently bonded to the inorganic particles and, more preferably, directly, i.e. without the bias of organic spacer groups forming a bridge between said chains and said particles. In other terms, each first chain is linked to a particle via a covalent bond between the particle and at least one repetitive unit of the first chain.

The inorganic particles are also bonded to polymer chains (referred to as second chains) constituted of at least one fluorinated polymer not carrying proton-exchanging groups, the bond being carried out indirectly:
- said second chains being bonded to the particles via organic spacer groups (referred to as first alternative); or
- said second chains being bonded to first chains such as defined hereinabove via organic spacer groups, said first chains being bonded themselves to the particles (referred to as second alternative); or
- a portion of said second chains being bonded to the particles via organic spacer groups while the other portion of said second chains is bonded to first chains such as defined hereinabove via organic spacer groups, said first chains being bonded themselves to the particles (referred to as third alternative).

In other terms, this means that:
- according to the first alternative, each one of said second chains is bonded to a particle via at least one organic spacer group (which means, in other words, that the organic spacer group or groups are thus covalently bonded, by one of the ends thereof, to a particle and are covalently bonded, by another of the ends thereof, to a second chain);
- according to the second alternative, each one of said second chains is bonded to at least one first chain such as defined hereinabove via at least one organic spacer group (which means, in other words, that these organic spacer group or groups are thus covalently bonded, by one of the ends thereof, to a first chain and are covalently bonded, by another of the ends thereof, to a second chain, with the understanding that the first chain is also covalently bonded to a particle, which does not exclude, according to the proportion of the second chains in relation to the first chains, that first chains are, in addition, bonded solely, covalently, to a particle;
- according to the third alternative, a portion of said second chains is bonded to the particles via organic spacer groups (or in other words, each one of said second chains of this portion is bonded to a particle via at least one organic spacer group in accordance with what is described for the first alternative) and the other portion of said second chains is covalently bonded to first chains via organic spacer groups (or in other words, each one of said second chains of this portion is bonded to at least one first chain via at least one organic spacer group in accordance with what is described according to the second alternative). This does not exclude, according to the proportion of the second chains in relation to the first chains, that first chains are, in addition, bonded solely, covalently, to a particle.

Again in other words, the bond between the particles and the second chains is carried out:
- according to the first alternative, via organic spacer groups forming a bridge between the particles and the second chains;
- according to the second alternative, via the first chains which are bonded to the second chains via organic spacer groups forming a bridge between the first chains and the second chains, given that the first chains are bonded, covalently, to the particles;
- according to the third alternative, both via organic spacer groups forming a bridge between the particles and the second chains and via the first chains which are bonded to the second chains via organic spacer groups forming a bridge between the first chains and the second chains, given that the first chains are bonded, covalently, to the particles.

Again in other terms, according to the first alternative, if the first polymer chains are represented by $Y^1$, the second polymer chains by $Y^2$ and the organic spacer groups by $X'$, the invention can be defined as particles being bonded, covalently, to grafts having the following formulas:

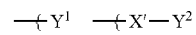

with the brackets indicating that $Y^1$ or $X'$ are directly bonded to a particle.

According to the second alternative, the invention can also be defined as particles being bonded, covalently, to grafts having the following formula:

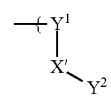

and, optionally, grafts having the following formula:

with the brackets indicating that $Y^1$ is directly bonded to a particle.

According to the third alternative, the invention can also be defined as particles being bonded, covalently, to grafts having the following formulas:

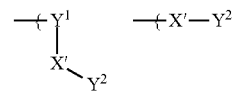

and, optionally, grafts having the following formula:

with the brackets indicating that $Y^1$ or $X'$ are directly bonded to a particle.

It is understood that the organic spacer group is separate from the first chains and is a non-polymeric group.

According to a particular embodiment of the invention, only the first alternative can be considered, i.e. all of the second chains are bonded to the particles via organic spacer groups.

The abovementioned fluorinated polymer or polymers that form second chains can be polymers comprising one or several repetitive units, with at least one of these units comprising at least one fluorine atom.

More specifically, this can be:
- a (co)polymer comprising a repetitive unit stemming from a fluorinated monomer, for example, polytetrafluoroethylenes (known as the abbreviation PTFE), polyvinylidene fluorides (known as the abbreviation PVDF), copolymers of fluorinated ethylene-propylene (known as the abbreviation FEP), copolymers of ethylene and of tetrafluoroethylene (known as the abbreviation ETFE);
- a copolymer comprising at least two types of repetitive units stemming from fluorinated monomers, for example a copolymer of vinylidene fluoride and of hexafluoropropene (known as the abbreviation poly(VDF-co-HFP).

Preferably, the fluorinated polymers can be polymers comprising one or several repetitive units, with each one of these repetitive units comprising at least one fluorine atom, such that:
- the polymers comprising a single repetitive unit stemming from a fluorinated monomer, such as polytetrafluoroethylenes (known as the abbreviation PTFE), polyvinylidene fluorides (known as the abbreviation PVDF);
- copolymers comprising two repetitive units stemming from two fluorinated monomers, such as copolymers of vinylidene fluoride and of hexafluoropropene (known as the abbreviation poly(VDF-co-HFP)).

It is understood that at least one of its repetitive units will be modified by the fact that it is bonded to an organic spacer group, which forms a bridge between a second chain and a particle or a first chain and a second chain.

In terms of the invention, the organic spacer groups (namely, organic groups forming a bridge between the particles and said second chains or between second chains and first chains) can be a non-polymeric hydrocarbon group, having the form of a linear or branched chain, into which can be inserted one or several groups (referred to as linking groups), such as —(C=O)—, —(C=O)O—, —SO$_2$ groups, amide groups, amine groups, silanoxy groups.

More specifically, the organic spacer group can have the following formula (III):

$$—X^1—R^1—X^2— \qquad (III)$$

wherein:
$X^1$ is the group covalently bonded to a particle or to a first chain, with this group able to be one of the linking groups mentioned hereinabove;
$R^1$ is an organic group forming a bridge between $X^1$ and $X^2$; and
$X^2$ is the group covalently bonded to at least one second chain, with this group able to be one of the linking groups mentioned hereinabove.

More specifically, when $X^1$ is a group covalently bonded to a particle, the group $X^1$ can be a silanoxy group, i.e. a group that can have the following formula (IV):

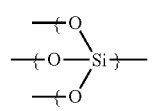 (IV)

the brackets present on the oxygen atoms indicating the locations by which the silanoxy group is bonded to the particle (in other terms, the silanoxy group is bonded to the particle by three bonds via the oxygen atoms) and the bracket has on the silicon atom indicating the location by which the silicon atom is bonded to the group $R^1$.

The group $R^1$ can be an alkylene group and, more specifically, an alkylene group comprising from 1 to 15 carbon atoms, for example, an n-propylene group.

The group $X^2$ can be an amine group that has one of the following formulas (V) and (VI):

 (V)

 (VI)

wherein $R^2$ represents an alkyl group comprising from 1 to 10 carbon atoms.

For the formula (V), the bracket to the left of the nitrogen atom indicates the location by which the nitrogen atom is bonded to the group $R^1$ and the bracket to the right of the nitrogen atom indicates the location by which the nitrogen atom is bonded to a second chain.

For the formula (VI), the bracket to the left of the nitrogen atom indicates the location by which the nitrogen atom is bonded to the group $R^1$ and the brackets to the right of the nitrogen atom indicate the locations by which the nitrogen atom is bonded to one or several second chains (in other terms, the nitrogen atom is bonded to a second chain by two covalent bonds, for example, established between two adjacent units of the second chain or is bonded to two second separate chains thus forming a bridge between the two second chains).

By way of example, the organic spacer group can have one of the following formulas (VII) and (VIII):

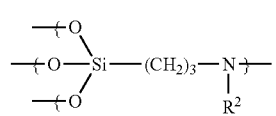 (VII)

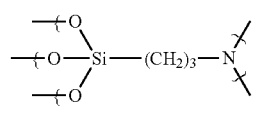 (VIII)

$R^2$ being such as defined hereinabove and the brackets having a meaning that is identical to that given for the formulas (V) and (VI) hereinabove.

With regards to the inorganic particles, they can be particles of zeolites, particles of zirconium phosphates, particles of zirconium phosphonates, particles of clays, particles of oxides such as silica, alumina, zirconia, titanium oxide.

In particular, the inorganic particles can be particles of oxide, such as particles of silica.

In particular, the silica particles are particularly advantageous, because they form hydrophilic particles comprising —OH groups, with these groups being intrinsically present on these particles, as soon as they are in contact with the humidity of the ambient air.

These hydrophilic groups, such as —OH groups, can participate in the covalent bonding with the first chains and with the second chains via an organic spacer group.

By way of example, particles in accordance with the invention can be particles of silica covalently bonded to first chains formed by poly(sodium 4-vinylbenzenesulfonate) (optionally in the form of an acid wherein Na is replaced with a hydrogen atom) and to second chains formed by a copolymer of vinylidene fluoride and of hexafluoropropene via an organic spacer group having formulas (VII) or (VIII) such as defined hereinabove.

The particles of the invention have, as indicated hereinabove, a proton conduction through the nature of the first chains and are also not sensitive to the phenomenon of solubilisation and of elution in the presence through the nature of the second chains (namely, the fluorinated polymers), with the presence of these second chains also allowing for the forming of particles in the form of a membrane, without requiring being mixed with a polymer forming a matrix. Also, the invention can relate to membranes formed of inorganic particles in accordance with the invention.

Consequently, these particles very naturally have application in the field of proton-conducting materials, such as the proton-conducting membranes used, for example, in the field of fuel cells.

The membranes such as defined hereinabove can advantageously be incorporated into fuel cell devices.

Thus, the invention also relates to a device comprising at least one electrode-membrane-electrode assembly, wherein the membrane is such as defined hereinabove.

The fuel cell device generally comprises several electrode-membrane-electrode assemblies.

In order to prepare such an assembly, the membrane can be placed between two electrodes, for example made of fabric or of carbon paper soaked with a catalyst. The assembly formed from the membrane arranged between the two electrodes is then pressed at a suitable temperature so as to obtain good electrode-membrane adhesion.

The electrode-membrane-electrode assembly is then placed between two plates that provide the electrical conduction and the supplying of electrodes with reagents. These plates are commonly referred to by the term bipolar plates.

Finally, the invention also relates to a method for preparing particles such as defined hereinabove, said method comprising a step of putting into contact of inorganic particles covalently bonded to first polymer chains formed by at least one polymer carrying proton-exchanging groups, optionally in the form of salts, with at least one fluorinated polymer not carrying proton-exchanging groups in the presence of a reagent comprising at least one group able to react with the inorganic particles and/or the first polymer chains in order to form a covalent bond (referred to as first group) and at least one group (referred to as second group) able to react with at least one group of said fluorinated polymer in order to form a covalent bond and thus said second chains such as defined hereinabove and a reaction step between the reagent, the particles and the fluorinated polymer whereby inorganic particles result in accordance with the invention and such as defined hereinabove.

With regards to the inorganic particles, they can be particles of zeolites, particles of zirconium phosphates, particles of zirconium phosphonates, particles of clays, particles of oxides such as silica, alumina, zirconia, titanium oxide.

In particular, the inorganic particles can be particles of oxide, such as particles of silica.

In particular, the silica particles are particularly advantageous, because they form hydrophilic particles comprising —OH groups, with these groups being intrinsically present on these particles, as soon as they are in contact with the humidity of the ambient air, with these —OH group being groups able to react with an group of the aforementioned reagent in order to form a covalent bond. These particles are particularly suitable for the embodiment, wherein the bond between the second polymer chains is carried out on the particles via an organic spacer group.

In the case where the particles or the first chains comprise a —OH group, the reagent can comprise as in the first group (namely, here, a group able to react with the inorganic particles or the first chains) in order to form a covalent bond, a group chosen from among the following groups:

$COOR^3$ with $R^3$ representing an atom of hydrogen, an alkyl group comprising from 1 to 30 carbon atoms or a phenyl group;

COCl;

$COCH_2CO$—$R^3$ with $R^3$ representing an atom of hydrogen, an alkyl group comprising from 1 to 30 carbon atoms or a phenyl group;

$PO(OH)_2$, —$PO(OR^4)(OH)$ or —$PO(OR^4)(OR^5)$ with $R^4$ and $R^5$, identical or different, representing an alkyl group comprising from 1 to 30 carbon atoms or a phenyl group;

CO(NHOH);

$M(OR^6)_{n-x-1}Z_x$ with x being a whole number ranging from 1 to (n−1), M being a metal or a metalloid, n being a degree of oxidation of M, $R^6$ representing an atom of hydrogen, an alkyl group comprising from 1 to 30 carbon atoms, a phenyl group, a monovalent metal cation, or a group having the formula $N^+R^3_4$, with $R^3$ representing an atom of hydrogen, an alkyl group comprising from 1 to 30 carbon atoms, or a phenyl group, and Z represents a hydrogen atom, an alkyl group comprising from 1 to 30 carbon atoms, a phenyl group or a halogen atom;

$SO_3M'$ with M' representing an atom of hydrogen, a monovalent metal cation or a group having the formula $N^+R^3_4$ with $R^3$ representing an atom of hydrogen, an alkyl group comprising from 1 to 30 carbon atoms or a phenyl group;

$B(OM')_2$ with M' representing an atom of hydrogen, a monovalent metal cation or a group having the formula $N^+R^3_4$ with $R^3$ representing an atom of hydrogen, an alkyl group comprising from 1 to 30 carbon atoms or a phenyl group;

OH;

and the combinations thereof.

For the group having the formula -$M(OR^6)_{n-x-1}Z_x$ such as defined hereinabove, M can represent a metal element, such as a transition element with a given degree of oxidation n or a metalloid element such as Si, Ge, Te with a given degree of oxidation n, with the degrees of oxidation that can be considered for each metal or metalloid element being known to those skilled in the art. As an example of groups that are in accordance with this definition, mention can be made of the group having the formula Si(OR$^6$)$_{3-x}$Z$_x$ with x being a whole number ranging from 1 to 3, Z and R$^6$ having the same definitions as those given hereinabove.

More particularly, a suitable group can be a alkoxysilane group —Si(OR')$_3$, with R' being an alkyl group comprising from 1 to 10 carbon atoms, such as a triethoxysilane group, which will react, for example, with the —OH groups present on the particles in order to form a silanoxy group, such as the one having the abovementioned formula (IV). This reaction can be catalysed by the presence of amine compounds.

It is understood that the first groups are also adapted in order to form a covalent bond with the first chains, when these first chains comprise at least one group able to react with said first groups.

The reagent also comprises a second group able to react with at least one group of said fluorinated polymer in order to form a covalent bond, the reaction implemented able to be a reaction that involves a step of removing hydrofluoric acid in one of the units of the polymer thus forming a double bond followed by a step of nucleophilic addition on the double bond, with the nucleophilic addition being carried out via an anionic group carried by the reaction or a group carrying a free doublet.

Also, the second group able to react according to the steps mentioned hereinabove can be an amine group —NHR$^8$ with R$^8$ being a hydrogen atom or an alkyl group comprising from 1 to 10 carbon atoms.

Without being bound by theory and starting with a fluorinated polymer comprising a repetitive unit coming from the polymerisation of the vinylidene fluoride, the reaction scheme of the abovementioned reaction with a secondary amine —NHR$^8$ (with R$^8$ being an alkyl group) can be as follows:

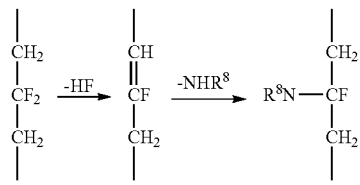

Finally, the reaction scheme of the abovementioned reaction with a primary amine —NH$_2$ can be as follows:

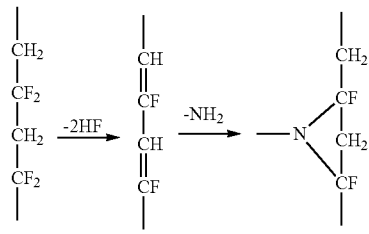

The nitrogen atom can also connect two separate second polymer chains.

More specifically, the reagent can be a reagent that has the following general formula (IX):

with R$^1$, R$^7$ and R$^8$ being such as defined hereinabove.

Even more specifically, the reagent can be a compound (3-aminopropyl)trialcoxysilane, such as a compound (3-aminopropyl)triethoxysilane of the following formula (X):

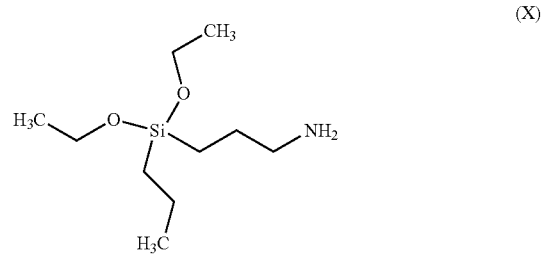

with this compound also known under the abbreviation APTES.

Alkoxysilane groups are particularly suited for creating —Si—O—Si-bonds with particles of silica, while the amine group is able, as developed hereinabove, to create a covalent bond with a fluorinated polymer.

It is understood that the reagent, after having reacted, allows to subsist organic spacer groups, such as defined in the portion devoted to the description of the particles as such.

The step of putting into contact can be carried out in the presence of an organic solvent, for example, an aprotic polar organic solvent, such as dimethylsulfoxide.

After the step of putting into contact and before the reaction step, with the resulting mixture can be subjected to a step of evaporation of the organic solvent, for example, by pouring the mixture on a hot plate, with the mixture thus evaporated forming a membrane. The reaction step can thus take place on the mixture put into the form of a membrane.

The reaction step between the reagent, the grafted particles and the fluorinated polymer can be carried out by heating the reaction mixture to a suitable temperature so that the coupling reaction takes place, for example, at a temperature of 150° C.

Furthermore, after the reaction step, whether or not the mixture is put in the form of a membrane, the method can include, where applicable, a step of converting proton-conducting groups in the form of salts into acid groups, with this step of converting consisting in plunging the particles into an acid solution.

The invention shall now be described in reference to the following examples, given for the purposes of information and in a non-limiting manner.

DETAILED EXPOSURE OF PARTICULAR EMBODIMENTS

Comparative Example

Figure 1:
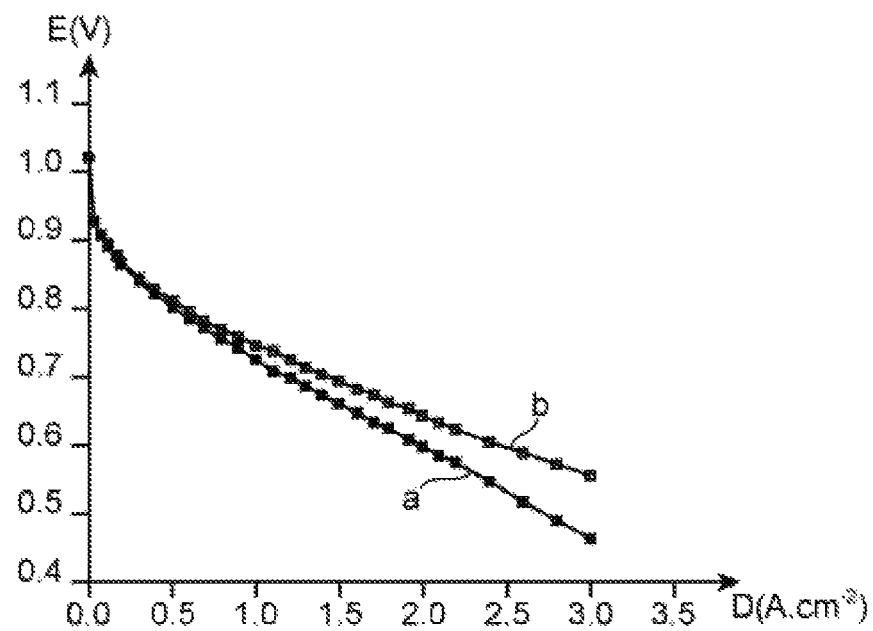
FIG. 1 is a graph showing the change in the voltage E (in V) as a function of the current density D (in A·cm$^{-2}$) for the cell comprising the membrane 1 (curve a) and for the cell comprising the membrane 2 (curve b).

This example shows the preparation of a mixture in order to produce a composite material that is compliant with what is proposed in prior art, i.e. a composite material comprising a matrix made from a copolymer of vinylidene fluoride and of hexafluoropropene and a filler formed by nanoparticles of silica grafted by poly(sodium 4-vinylbenzenesulfonate).

The copolymer is supplied by the company Solvay under the reference Solef® 21216.

The grafted particles have a composition by weight of silica and of poly(sodium 4-vinylbenzenesulfonate) respectively of 15% and of 85%.

The preparation is carried out in the following way.

In a 50-mL Erlenmeyer, 1 g of copolymer is weighed. Then, the nanoparticles (1.631 g) and dimethylsulfoxide (26 g) are added to the copolymer. The proportions of the ingredients were chosen in order to obtain a dry extract of 9.2% and in order to obtain a good compromise between the viscosity and the solubility of the copolymer.

The mixture is heated to 60° C., under moderate stirring, in order to accelerate the solubilisation of the copolymer and of the nanoparticles, with the non-solubilised nanoparticles able to be crushed using a spatula.

Then the resulting mixture is processed with a mixer of the "Speedmixer" type from the brand Hauschild, model DAC 400.1 FHZ, which makes it possible to obtain a degassed mixture with a rotation of 2000 rpm$^{-1}$ in 2 minutes.

Example 1

This example shows the preparation of a mixture in order to produce particles in accordance with the invention.

To do this, a protocol is applied similar to the one from the comparative example except that the compound APTES is added (of which the formula is defined in the description hereinabove) for 0.068 g into the mixture after the step of solubilisation of the nanoparticles and of the copolymer of vinylidene fluoride and of hexafluoropropene.

Example 2

This example shows the preparation of membranes from mixtures prepared in the comparative example and in the example 1.

To do this, the aforementioned mixtures are poured under a laminar flow hood onto a glass plate cleaned beforehand respectively with acetone, with methanol then with acetone, with the pouring being carried out using a manual applicator of the "Hand coater" type provided with an air-gap of 500 µm. The glass plate, on which the solution was poured, is placed on a plate heated to 110° C., still under a laminar flow hood, for 2 hours in order to evaporate the solvent. Use of the laminar flow hood for the pouring and the evaporation is justified in order to prevent the introduction of dusts into the membranes.

At the end of the step of evaporating on a hot plate, the membranes are brought to 150° C. for 2 hours in order to increase the yield of the reaction of the reagent APTES for the membrane poured and evaporated from the mixture of the example 1.

The membranes obtained have a thickness of 25 µm.

Example 3

In this example, the membranes obtained in the example 2 are subjected to a step of acidification in order to transform the sodium sulfonate groups into sulphonic acid groups, with the resulting membranes thus being proton-conducting membranes.

To do this, the membranes are put into contact with a solution of concentrated sulphuric acid at 98% at ambient temperature for 4 days.

The membranes are then rinsed three times with water and dried at ambient temperature. These membranes are, hereinbelow, respectively named "Membrane 1" (for the one coming from the mixture of the comparative example) and "Membrane 2" (for the one coming from the mixture of the example 1).

Example 4

In this example, the physical-chemical properties of membranes were tested. The results are provided in the table hereinbelow.

| Membrane | Solubility in DMSO[1] | Solubility in DMF[2] | Solubility in NMP[3] | Swelling in water (%) | Proton conductivity (mS · cm$^{-1}$) |
|---|---|---|---|---|---|
| Membrane 1 | Yes | Yes | Yes | 33 | 68 |
| Membrane 2 | No | No | No | 12 | 89 |

[1]DMSO corresponding to dimethylsulfoxide
[2]DMF corresponding to N,N-dimethylformamide
[3]NMP corresponding to N-methylpyrrolidone The membrane 2 obtained with the particles of the invention is insoluble in organic solvents, including polar solvents. This property demonstrates the effectiveness of the coupling reaction between the reagent APTES, the nanoparticles and the copolymer of vinylidene fluoride and of hexafluoropropene.

Moreover, the results obtained with the membrane 2 show a substantial drop in the swelling in water (often at the origin of the ageing of cells) and a significant increase in the proton conductivity (which is an essential criterion for the operation of a cell).

Example 5

In this example, the membranes of the example 3 are placed in a fuel cell $H_2/O_2$ and were characterised, in this cell environment, at 2 bars and 60° C.

It was determined, in a first step, the change in the voltage E (in V) as a function of the current density D (in A·cm$^{-2}$), with the results being listed in the FIG. 1 (curve a) for the cell comprising the membrane 1 and curve b) for the cell comprising the membrane 2.

The open circuit voltage obtained for the two cells is greater than 1 V (respectively, 1.019 V for the cell comprising the membrane 1 and 1.009 V for the cell comprising the membrane 2). This result indicated that there is no "crossover" or leakage current for the cell comprising the membrane 2.

Then, at a low current density, the curves a) and b) are superimposed, which indicates identical catalytic activity for the two membranes.

Finally, at a higher density current, the voltages obtained for the cell comprising the membrane 2 are greater than those obtained for the cell comprising the membrane 1. For example, the current density obtained in order to reach 0.7 V is 1.4 A·cm$^{-2}$ for the cell comprising the membrane 2, although it is only 1.2 A·cm$^{-2}$ for the cell comprising the membrane 1, which represents an increase in performance of 16% for the cell comprising the membrane 2.

Figure 2:
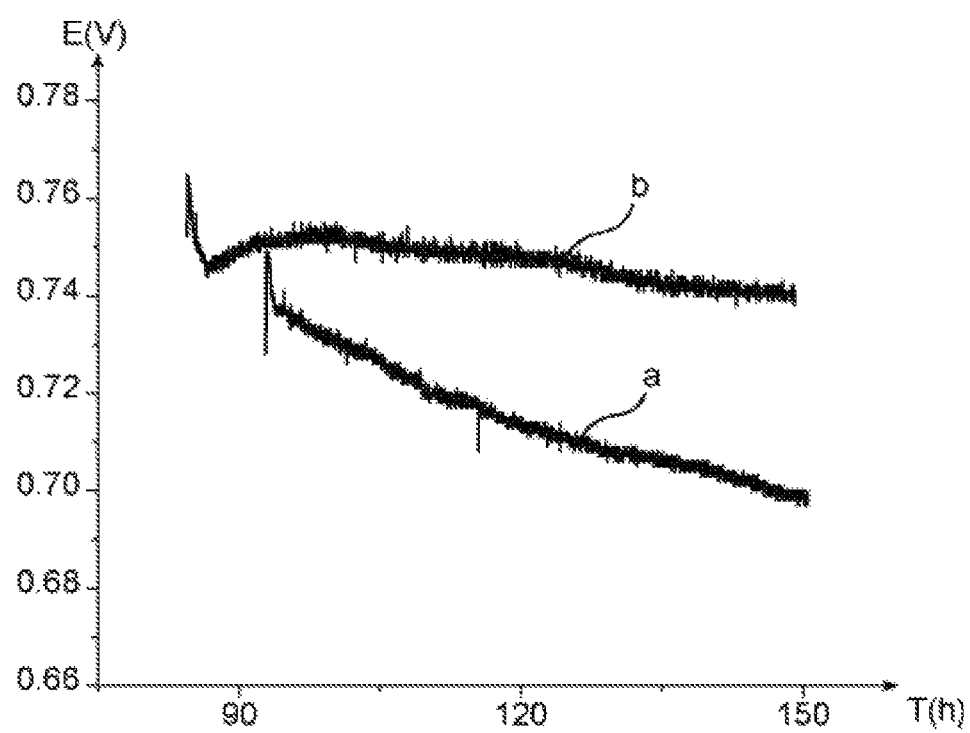
FIG. 2 is a graph showing the change in the voltage E (in V) as a function of the time T (in hours) for the cell comprising the membrane 1 (curve a) and for the cell comprising the membrane 2 (curve b).

It was determined, in a second step, the change in the voltage E (in V) as a function of the time (in hours) at 80° C. for 150 hours for a fixed current density of 1 A·cm$^{-2}$, with the results being listed in the FIG. 2 (curve a) for the cell comprising the membrane 1 and curve b) for the cell comprising the membrane 2. This entails in fact observing the voltage drop as a function of the time at a fixed current density.

The decline in voltage obtained with the cell comprising the membrane 2 is 2.5 times lower than that obtained with the cell comprising the membrane 1. This attests to better stability of the nanoparticles in the membrane 2 and validates the principle of the stabilisation of the membranes in accordance with the invention.

What is claimed is:

1. Proton-conducting membrane for fuel cell formed of inorganic particles bonded, covalently, to first polymer chains constituted of at least one polymer carrying proton-exchanging groups, optionally in the form of salts, said particles also being bonded to second polymer chains constituted of at least one fluorinated polymer not carrying proton-exchanging groups, with the bond between the particles and said second polymer chains corresponding to one of the following alternatives:
   said second polymer chains are bonded to the particles via organic spacer groups; or
   said second polymer chains are bonded to first polymer chains via organic spacer groups; or
   a portion of said second polymer chains is bonded to the particles via organic spacer groups while the other portion of said second polymer chains is bonded to first polymer chains via organic spacer groups.

2. Membrane according to claim 1, wherein the proton-exchanging groups are groups having formulas —PO$_3$H$_2$, —CO$_2$H, or —SO$_3$H, with these groups optionally able to be in the form of salts.

3. Membrane according to claim 1, wherein the polymer or polymers carrying proton-exchanging groups, optionally in the form of salts, forming first polymer chains are polymers comprising one or several repetitive units coming from the polymerisation of one or several vinyl monomers, said monomers have at least one proton-exchanging group, optionally in the form of salts.

4. Membrane according to claim 3, wherein the vinyl monomer or monomers are styrenic monomers comprising at least one proton-exchanging group, optionally in the form of salts.

5. Membrane according to claim 1, of which the polymer carrying proton-exchanging groups is poly(sodium 4-vinylbenzenesulfonate) or poly(4-vinylbenzenesulfonic acid).

6. Membrane according to claim 1, wherein all of the second polymer chains are bonded to the particles via organic spacer groups.

7. Membrane according to claim 1, wherein the fluorinated polymer or polymers not carrying proton-exchanging groups, forming said second polymer chains, are polymers comprising one or several repetitive units, with each one of these repetitive units comprising at least one fluorine atom, with these polymers being chosen from:
   the polymers comprising a single repetitive unit coming from a fluorinated monomer, such as polytetrafluoroethylenes (PTFE), polyvinylidene fluorides (known as the abbreviation PVDF);
   copolymers comprising two repetitive units coming from two fluorinated monomers, such as copolymers of vinylidene fluoride and of hexafluoropropene (poly(VDF-co-HFP)).

8. Membrane according to claim 1, wherein the organic spacer group is a non-polymeric hydrocarbon group, having the form of a linear or branched chain, into which can be inserted one or several groups (referred to as linking groups) chosen from —(C=O)—, —(C=O)O—, —SO$_2$, amide groups, amine groups, silanoxy groups.

9. Membrane according to claim 8, wherein the organic spacer group has the following formula (III):
   wherein:
   $X^1$ is the group covalently bonded to a particle or to a first polymer chain, with this group being one of the linking groups defined previously;
   $R^1$ is an organic group forming a bridge between $X^1$ and $X^2$; and
   $X^2$ is the group covalently bonded to at least one second polymer chain, with this group being one of the linking groups defined previously.

10. Inorganic particici Membrane according to claim 9, wherein the group $R^1$ is an alkylene group.

11. Inorganic particici Membrane according to claim 1, which are particles of zeolites, particles of zirconium phosphates, particles of zirconium phosphonates, particles of clays, particles of oxides such as silica, alumina, zirconia, titanium oxide.

12. Inorganic particici Membrane according to claim 1, which are particles of silica.

13. A fuel cell comprising at least one electrode-membrane-electrode assembly, wherein the membrane is such as defined in claim 1.

14. Method for the preparation of inorganic particles as defined in claim 1, said method comprising a step of putting into contact of inorganic particles covalently bonded to first polymer chains formed by at least one polymer carrying proton-exchanging groups, optionally in the form of salts, with at least one fluorinated polymer not carrying proton-exchanging groups in the presence of a reagent comprising at least one group able to react with the inorganic particles and/or the first polymer chains in order to form a covalent bond and at least one second group able to react with at least one group of said fluorinated polymer in order to form a covalent bond and a reaction step between the reagent, the particles and the fluorinated polymer which results in inorganic particles covalently bonded, to first polymer chains constituted of at least one polymer carrying proton-exchanging groups, optionally in the form of salts, and being bonded to second polymer chains constituted of at least one fluorinated polymer not carrying proton-exchanging groups, wherein either
   said second polymer chains are bonded to the particles via organic spacer groups; or
   said second polymer chains are bonded to first polymer chains via organic spacer groups; or
   a portion of said second polymer chains being bonded to the particles via organic spacer groups while the other portion of said second polymer chains is bonded to first polymer chains via organic spacer groups.

15. Inorganic particles bonded, covalently, to first polymer chains constituted of at least one polymer carrying proton-exchanging groups, optionally in the form of salts, said particles also being bonded to second polymer chains constituted of at least one fluorinated polymer not carrying proton-exchanging groups, with the bond between the particles and said second polymer chains corresponding to one of the following alternatives:

said second polymer chains are bonded to the particles via organic spacer groups; or said second polymer chains are bonded to first polymer chains via organic spacer groups; or a portion of said second polymer chains is bonded to the particles via organic spacer groups while the other portion of said second polymer chains is bonded to first polymer chains via organic spacer groups;

wherein the inorganic particles form a membrane in a fuel cell.

* * * * *